US012547474B2

United States Patent

(12) United States Patent
Xu et al.

(10) Patent No.: US 12,547,474 B2
(45) Date of Patent: Feb. 10, 2026

(54) ROUTING INFORMATION TRANSMISSION METHOD AND APPARATUS, AND COMMUNICATION SYSTEM

(71) Applicant: HUAWEI TECHNOLOGIES CO., LTD., Shenzhen (CN)

(72) Inventors: Haijun Xu, Beijing (CN); Feng Guo, Beijing (CN); Xudong Zhang, Beijing (CN); Rong Jiang, Beijing (CN); Peng Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 502 days.

(21) Appl. No.: 18/160,919

(22) Filed: Jan. 27, 2023

(65) Prior Publication Data

US 2023/0168948 A1 Jun. 1, 2023

Related U.S. Application Data

(63) Continuation of application No. PCT/CN2021/107092, filed on Jul. 19, 2021.

(30) Foreign Application Priority Data

Jul. 30, 2020 (CN) ........................ 202010753143.5

(51) Int. Cl.
*G06F 9/44* (2018.01)
*G06F 9/50* (2006.01)

(52) U.S. Cl.
CPC .......... *G06F 9/5083* (2013.01); *G06F 9/5061* (2013.01)

(58) Field of Classification Search
CPC .................................................... G06F 9/5081
(Continued)

(56) References Cited

U.S. PATENT DOCUMENTS 8,675,656 B2 3/2014 Guichard et al.
2018/0013693 A1* 1/2018 Dumitriu .............. H04L 67/563

FOREIGN PATENT DOCUMENTS

CN 106815218 A 6/2017

OTHER PUBLICATIONS

"Towards an Open, Disaggregated Network Operating System," AT&T Intellectual Property, total 17 pages (Nov. 2017).

(Continued)

*Primary Examiner* — Timothy A Mudrick
(74) *Attorney, Agent, or Firm* — Leydig, Voit & Mayer, Ltd.

(57) ABSTRACT

Disclosed are a routing information transmission method and apparatus, and a communication system, and belong to the field of communication technologies. The routing information transmission method is applied to a system including data middleware and a routing information base (RIB), and the data middleware communicates with the RIB. The data middleware may obtain routing information from the RIB, and send the routing information obtained from the RIB to a third-party consumer device. In addition, the data middleware may also obtain routing information from a third-party producer device, and send the routing information obtained from the third-party producer device to the RIB. Therefore, according to technical solutions provided herein, the routing information included in the RIB is openly exported, and the routing information generated by the third-party producer device is imported into the RIB.

20 Claims, 10 Drawing Sheets

(58) Field of Classification Search
USPC .......................................................... 718/105
See application file for complete search history.

(56) References Cited

OTHER PUBLICATIONS

Arista EOS, "Data-Driven Cloud Networking," Arista Networks, [oniline] https://www.arista.com/en/solutions/software-defined-networking, total 5 pages (2024).
Viktor Leijon, Principal Engineer, "Advanced Automation with Cisco NSO," Cisco Live, BRKATO-3000, total 51 pages (Jun. 17, 2022).
Yan et al.,"BGPmon: A real-time, scalable, extensible monitoring system," Cybersecurity Applications & Technology Conference for Homeland Security, Total 12 pages, Institute of Electrical and Electronics Engineers, New York, New York (Mar. 2009).
Orsini et al., "BGPStream: A Software Framework for Live and Historical BGP Data Analysis," Internet Measurement Conference, IMC 2016,XP058306568, Total 16 pages (Nov. 2016).

* cited by examiner

ROUTING INFORMATION TRANSMISSION METHOD AND APPARATUS, AND COMMUNICATION SYSTEM

CROSS-REFERENCE TO RELATED APPLICATIONS

This application is a continuation of International Application No. PCT/CN2021/107092, filed on Jul. 19, 2021, which claims priority to Chinese Patent Application No. 202010753143.5, filed on Jul. 30, 2020. The disclosures of the aforementioned applications are hereby incorporated by reference in their entireties.

TECHNICAL FIELD

This application relates to the field of communication technologies, and in particular, to a routing information transmission method and apparatus, and a communication system.

BACKGROUND

A routing system in a related technology is a closed system, and includes a management plane, a control plane, and a forwarding plane. The control plane is configured to generate routing information (for example, various routing tables), and deliver the routing information to the forwarding plane.

Because the routing system in the related technology is a closed architecture, an external third-party consumer device cannot obtain the routing information in the routing system. Consequently, an observability capability of the routing system is poor. For example, external routing security analysis software cannot obtain the routing information in the routing system, and consequently cannot analyze security of the routing system, and relevant personnel cannot learn of the security of the routing system.

SUMMARY

Embodiments of this application provide a routing information transmission method and apparatus, and a communication system. The routing information transmission method may be applied to a system including data middleware and a routing information base (RIB), and the data middleware communicates with the RIB. The data middleware may send routing information obtained from the routing information base RIB to a third-party consumer device, and send routing information obtained from a third-party producer device to the RIB, to implement routing system openness. The routing information transmission method and apparatus, and the communication system are described as follows:

According to a first aspect, a routing information transmission method is provided. The method is applied to a system including data middleware and a RIB, the data middleware communicates with the RIB, and the method includes: The data middleware receives a first request, where the first request is used to request target routing information; and the data middleware sends the target routing information to a third-party consumer device in response to the first request, where the target routing information is obtained by the data middleware from the RIB.

In the solution shown in this embodiment of this application, the data middleware may obtain routing information from the RIB, and send the routing information obtained from the RIB to the third-party consumer device, to openly export the routing information included in the RIB.

In addition, existence of the data middleware decouples the RIB from the third-party consumer device. The third-party consumer device and the RIB are unaware of each other. Interaction between the RIB and the data middleware and interaction between the data middleware and the third-party consumer device are independent of each other. The third-party consumer device does not need to determine deployment and specific implementation of the RIB. When a plurality of third-party consumer devices need to obtain the routing information included in the RIB, the plurality of third-party consumer devices may directly obtain the required routing information from the data middleware without being aware of the RIB, to reduce a burden of the RIB. Processing performed by the RIB is merely sending the routing information required by the data middleware to the data middleware.

In a possible implementation, the first request includes: a smoothing request sent by the third-party consumer device; or a subscription request sent by the third-party consumer device, where the subscription request includes a target type, and a type of the target routing information corresponds to the target type.

In the solution shown in this embodiment of this application, the first request may include at least two types. The first type is the smoothing request sent by the third-party consumer device. In this case, after the data middleware receives the smoothing request sent by the third-party consumer device, the data middleware sends smooth routing information to the third-party consumer device based on the smoothing request in response to the smoothing request. The second type is the subscription request sent by the third-party consumer device. In this case, after receiving the subscription request sent by the third-party consumer device, the data middleware may immediately send stored target-type routing information to the third-party consumer device in response to the subscription request; or may periodically obtain target-type routing information from the RIB, and periodically send the target-type routing information to the third-party consumer device; or may perform an operation of combining immediate sending and periodic sending. For example, after receiving the subscription request, the data middleware first immediately sends all the stored target-type routing information to the third-party consumer device, and then sends target-type routing information that is newly obtained by the data middleware each time subsequently to the third-party consumer device in real time.

In a possible implementation, the method further includes: The data middleware sends a smoothing request to the RIB in response to an exception in the routing information stored in the data middleware; the data middleware obtains the smooth routing information sent by the RIB based on the smoothing request; and the data middleware stores the smooth routing information, where the smooth routing information is routing information sent by the data middleware to the RIB based on the smoothing request.

In the solution shown in this embodiment of this application, when detecting that the stored routing information is exceptional, the data middleware may send the smoothing request to the RIB, to ensure accuracy and integrity of the stored routing information. After receiving the smoothing request, the RIB may send the smooth routing information to the data middleware based on the smoothing request. The data middleware receives and stores the smooth routing information.

In a possible implementation, the method further includes: The data middleware performs reconciliation processing based on the smooth routing information and the stored routing information, where the stored routing information is routing information stored before the smooth routing information is obtained.

In the solution shown in this embodiment of this application, after obtaining the smooth routing information, the data middleware may further perform reconciliation processing based on the smooth routing information and the stored routing information. The reconciliation processing may also be referred to as synchronization processing, smoothing processing, or the like, to align data in a producer and a consumer. The reconciliation processing may be either full reconciliation or incremental reconciliation. This is not limited in this application.

In a possible implementation, the method further includes: The data middleware subscribes to first-type routing information from the RIB; and the data middleware obtains the first-type routing information included in the RIB, where the first-type routing information includes the target routing information.

In the solution shown in this embodiment of this application, that the data middleware obtains the routing information included in the RIB may be as follows: obtaining all routing information included in the RIB, or obtaining the first-type routing information included in the RIB. This is not limited in this application.

Before obtaining the routing information included in the RIB, the data middleware needs to first subscribe to the routing information from the RIB. During the subscription, the data middleware may subscribe to all the routing information included in the RIB, or may subscribe to only the first-type routing information.

In a possible implementation, the system further includes a RIB broker, and the data middleware communicates with the RIB through the RIB broker.

In the solution shown in this embodiment of this application, communication between the data middleware and the RIB may be completed through the RIB broker. The RIB broker may have one or more of a format conversion function, a compliance check function, and a decoupling function. The following separately describes the format conversion function, the compliance check function, and the decoupling function.

Format conversion function: For example, the RIB broker converts a format of the routing information received from the RIB into a format corresponding to the data middleware, and then sends the routing information to the data middleware. The RIB broker may also convert a format of the routing information received from the data middleware into a format corresponding to the RIB, and then send the routing information to the RIB.

Compliance detection function: For example, the RIB broker may perform compliance check on the routing information (for example, the routing information that is from a third-party producer device and that is stored in the data middleware) received from the data middleware, to prevent a communication system fault caused by receiving non-compliant routing information by a control plane device.

Decoupling function: For example, the RIB broker may store the routing information received from the RIB, and send the routing information to the data middleware when the data middleware requests the routing information; or may store the routing information received from the data middleware, and send the routing information to the RIB when the RIB requests the routing information. In this way, decoupling between the data middleware and the RIB is implemented, and the data middleware and the RIB may not work at the same time.

According to a second aspect, a routing information transmission method is provided. The method is applied to a system including data middleware and a routing information base RIB, the data middleware communicates with the RIB, and the method includes: The data middleware obtains routing information generated by a third-party producer device; the data middleware stores the routing information; and the data middleware sends target routing information to the RIB.

In the solution shown in this embodiment of this application, the data middleware may obtain the routing information from the third-party producer device, and send the routing information obtained from the third-party producer device to the RIB. In this way, routing information generated by an external third-party producer device is imported into the RIB.

In addition, existence of the data middleware decouples the RIB from the third-party producer device. The third-party producer device and the RIB are unaware of each other. Interaction between the RIB and the data middleware and interaction between the data middleware and the third-party producer device are independent of each other. The third-party producer device does not need to determine deployment and specific implementation of the RIB. When a plurality of third-party producer devices need to deliver the routing information to the RIB, the plurality of third-party producer devices may directly deliver the routing information to the data middleware, and then the data middleware delivers the routing information to the RIB, to reduce a burden of the RIB.

In a possible implementation, before that the data middleware sends target routing information to the RIB, the method further includes: The data middleware receives a first request, where the first request is used to request the target routing information from the data middleware; and the first request includes: a smoothing request sent by the RIB; or a subscription request sent by the RIB, where the subscription request includes a target type, and a type of the target routing information corresponds to the target type.

In the solution shown in this embodiment of this application, in an example, each time after obtaining routing information generated by the third-party producer device, the data middleware may send newly obtained routing information to the RIB. In this example, the newly obtained routing information is the target routing information. In another example, the data middleware may send the target routing information to the RIB in response to the received first request.

The first request may include at least two types. The first type is the smoothing request sent by the RIB. In this case, after the data middleware receives the smoothing request sent by the RIB, the data middleware sends smooth routing information to the RIB based on the smoothing request in response to the smoothing request.

The second type is the subscription request sent by the RIB. In this case, after receiving the subscription request sent by the RIB, the data middleware may immediately send stored target-type routing information to the RIB in response to the subscription request; or may periodically obtain target-type routing information from the third-party producer device, and periodically send the target-type routing information to the RIB; or may perform an operation of combining immediate sending and periodic sending. For example, after receiving the subscription request, the data middleware first immediately sends all the stored target-type routing information to the RIB, and then sends target-type routing information that is newly obtained by the data middleware each time subsequently to the RIB in real time.

In a possible implementation, that the data middleware obtains routing information generated by a third-party producer device includes: The data middleware sends a smoothing request to the third-party producer device in response to an exception in the routing information stored in the data middleware; the data middleware receives the smooth routing information sent by the third-party producer device based on the smoothing request; and the data middleware stores the smooth routing information, where the smooth routing information is the routing information sent by the third-party producer device to the data middleware based on the smoothing request.

In the solution shown in this embodiment of this application, when detecting that the stored routing information is exceptional, the data middleware may send the smoothing request to the third-party producer device. After receiving the smoothing request, the third-party producer device may send the smooth routing information to the data middleware based on the smoothing request. The data middleware receives and stores the smooth routing information. In the foregoing smoothing process, accuracy and integrity of the routing information stored in the data middleware may be ensured.

In a possible implementation, that the data middleware obtains routing information generated by a third-party producer device includes: The data middleware sends a smoothing request to the third-party producer device in response to establishment of a connection between the data middleware and the third-party producer device; the data middleware receives the smooth routing information sent by the third-party producer device based on the smoothing request; and the data middleware stores the smooth routing information, where the smooth routing information is the routing information sent by the third-party producer device to the data middleware based on the smoothing request.

The connection established between the data middleware and the third-party producer device may be a connection established for the first time, or may be a connection re-established after the connection is disconnected.

In the solution shown in this embodiment of this application, when the data middleware establishes the connection to a third-party device, the data middleware may send the smoothing request to the third-party producer device. After receiving the smoothing request, the third-party producer device may send the smooth routing information to the data middleware based on the smoothing request. The data middleware receives and stores the smooth routing information.

For the connection established for the first time, the data middleware may obtain, through the foregoing smoothing process, the routing information generated by the third-party producer device before the connection is established. For the connection established not for the first time, through the foregoing smoothing process, an exception in the routing information stored in the data middleware may be avoided in a process of disconnecting the connection, and accuracy and integrity of the routing information stored in the data middleware are ensured.

In a possible implementation, the method further includes: The data middleware performs reconciliation processing based on the smooth routing information and the stored routing information.

In the solution shown in this embodiment of this application, the reconciliation processing may also be referred to as synchronization processing, smoothing processing, or the like. The reconciliation processing may be either full reconciliation or incremental reconciliation. This is not limited in this application. The reconciliation processing is performed, so that integrity and accuracy of the routing information stored in the data middleware may be ensured.

In a possible implementation, the routing information corresponds to a first type, and that the data middleware obtains routing information generated by a third-party producer device includes: The data middleware sends a subscription request to the third-party producer device, where the subscription request includes the first type, and the subscription request is used to request the routing information corresponding to the first type.

In the solution shown in this embodiment of this application, that the data middleware obtains routing information generated by a third-party producer device may be as follows: obtaining all routing information generated by the third-party producer device, or obtaining the first-type routing information generated by the third-party producer device. This is not limited in this application.

Before obtaining the routing information generated by the third-party producer device, the data middleware may first subscribe to the routing information from the third-party producer device. During the subscription, the data middleware may subscribe to all the routing information generated by the third-party producer device, or may subscribe to only the first-type routing information generated by the third-party producer device.

In a possible implementation, the system further includes a RIB broker, and the data middleware communicates with the RIB through the RIB broker.

In the solution shown in this embodiment of this application, communication between the data middleware and the RIB may be completed through the RIB broker. The RIB broker may have one or more of a format conversion function, a compliance check function, and a decoupling function. The following separately describes the format conversion function, the compliance check function, and the decoupling function.

Format conversion function: For example, the RIB broker converts a format of the routing information received from the RIB into a format corresponding to the data middleware, and then sends the routing information to the data middleware. The RIB broker may also convert a format of the routing information received from the data middleware into a format corresponding to the RIB, and then send the routing information to the RIB.

Compliance detection function: For example, the RIB broker may perform compliance check on the routing information (for example, the routing information that is from the third-party producer device and that is stored in the data middleware) received from the data middleware, to prevent a communication system fault caused by receiving non-compliant routing information by a control plane device.

Decoupling function: For example, the RIB broker may store the routing information received from the RIB, and send the routing information to the data middleware when the data middleware requests the routing information; or may store the routing information received from the data middleware, and send the routing information to the RIB when the RIB requests the routing information. In this way, decoupling between the data middleware and the RIB is implemented, and the data middleware and the RIB may not work at the same time.

According to a third aspect, a routing information transmission apparatus is provided. The apparatus includes data middleware, the data middleware communicates with a RIB, and the data middleware includes: a receiving module, configured to receive a first request, where the first request is used to request target routing information; and a sending module, configured to send the target routing information to a third-party consumer device in response to the first request, where the target routing information is obtained by the data middleware from the RIB.

In a possible implementation, the first request includes: a smoothing request sent by the third-party consumer device; or a subscription request sent by the third-party consumer device, where the subscription request includes a target type, and a type of the target routing information corresponds to the target type.

In a possible implementation, the sending module is further configured to send a smoothing request to the RIB in response to an exception in the stored routing information; and the data middleware further includes an obtaining module and a storage module, where the obtaining module is configured to obtain smooth routing information sent by the RIB based on the smoothing request; and the storage module is configured to store the smooth routing information.

In a possible implementation, the data middleware further includes a reconciliation module, configured to: perform reconciliation processing based on the smooth routing information and the stored routing information, where the stored routing information is routing information stored before the smooth routing information is obtained.

In a possible implementation, the data middleware further includes a subscription module, configured to subscribe to first-type routing information from the RIB; and the data middleware further includes the obtaining module, where the obtaining module is configured to obtain the first-type routing information included in the RIB, where the first-type routing information includes the target routing information.

In a possible implementation, the apparatus further includes the RIB.

In a possible implementation, the apparatus further includes a RIB broker, and the data middleware communicates with the RIB through the RIB broker.

According to a fourth aspect, a routing information transmission apparatus is provided. The apparatus includes data middleware, the data middleware communicates with a RIB, and the data middleware includes: an obtaining module, configured to obtain routing information generated by a third-party producer device; a storage module, configured to store the routing information; and a sending module, configured to send target routing information to the RIB.

In a possible implementation, before sending the target routing information to the RIB, the obtaining module is further configured to receive a first request, where the first request is used to request the target routing information from the data middleware; and the first request includes: a smoothing request sent by the RIB; or a subscription request sent by the RIB, where the subscription request includes a target type, and a type of the target routing information corresponds to the target type.

In a possible implementation, the sending module is further configured to send a smoothing request to the third-party producer device in response to an exception in the stored routing information; the obtaining module is further configured to receive smooth routing information sent by the third-party producer device based on the smoothing request; and the storage module is further configured to store the smooth routing information.

In a possible implementation, the sending module is further configured to send a smoothing request to the third-party producer device in response to establishment of a connection to the third-party producer device; the obtaining module is configured to receive the smooth routing information sent by the third-party producer device based on the smoothing request; and the storage module is further configured to store the smooth routing information.

In a possible implementation, the routing information corresponds to a first type, and the sending module is further configured to send a subscription request to the third-party producer device, where the subscription request includes the first type, and the subscription request is used to request the routing information corresponding to the first type.

In a possible implementation, the apparatus further includes the RIB.

In a possible implementation, the apparatus further includes a RIB broker, and the data middleware communicates with the RIB through the RIB broker.

According to a fifth aspect, a communication system is provided. The communication system includes a first network device, and the first network device includes the apparatus according to either the first aspect or the second aspect.

In a possible implementation, the communication system further includes a third-party producer device, and the third-party producer device is configured to deliver routing information to data middleware in the first network device.

In a possible implementation, the communication system further includes a third-party consumer device, and the third-party consumer device is configured to obtain the routing information from the data middleware in the first network device.

According to a sixth aspect, a communication system is provided. The communication system includes a first network device and a second network device, the first network device includes the apparatus according to any one of the third aspect and the possible implementations of the third aspect or the apparatus according to any one of the fourth aspect and the possible implementations of the fourth aspect, and the second network device includes a RIB.

According to a seventh aspect, a network device is provided. The network device includes a processor and a memory.

The memory stores one or more programs, and the one or more programs are configured to be executed by the processor and used to implement the method according to either the first aspect or the second aspect.

According to an eighth aspect, a computer-readable storage medium is provided. The computer-readable storage medium includes instructions; and when the computer-readable storage medium is run on a network device, the network device is enabled to perform the method according to the first aspect or the second aspect.

According to a ninth aspect, a computer program product including instructions is provided. When the computer program product runs on a network device, the network device performs the method according to the first aspect or the second aspect.

According to a tenth aspect, a chip is provided. The chip includes a programmable logic circuit and/or program instructions. When the chip runs, the chip is configured to implement the method according to the first aspect or the second aspect.

Beneficial effects brought by the technical solutions provided in embodiments of this application are as follows:

In the routing information transmission method provided in embodiments of this application, the data middleware may obtain the routing information from the RIB, and send the routing information obtained from the RIB to the third-party consumer device. In this way, the routing information in the RIB is openly exported, and may be used by external routing security analysis software to analyze security of the routing system based on the routing information included in the RIB or in another scenario.

DESCRIPTION OF EMBODIMENTS

Embodiments of this application provide a routing information transmission communication system.

Figure 1:
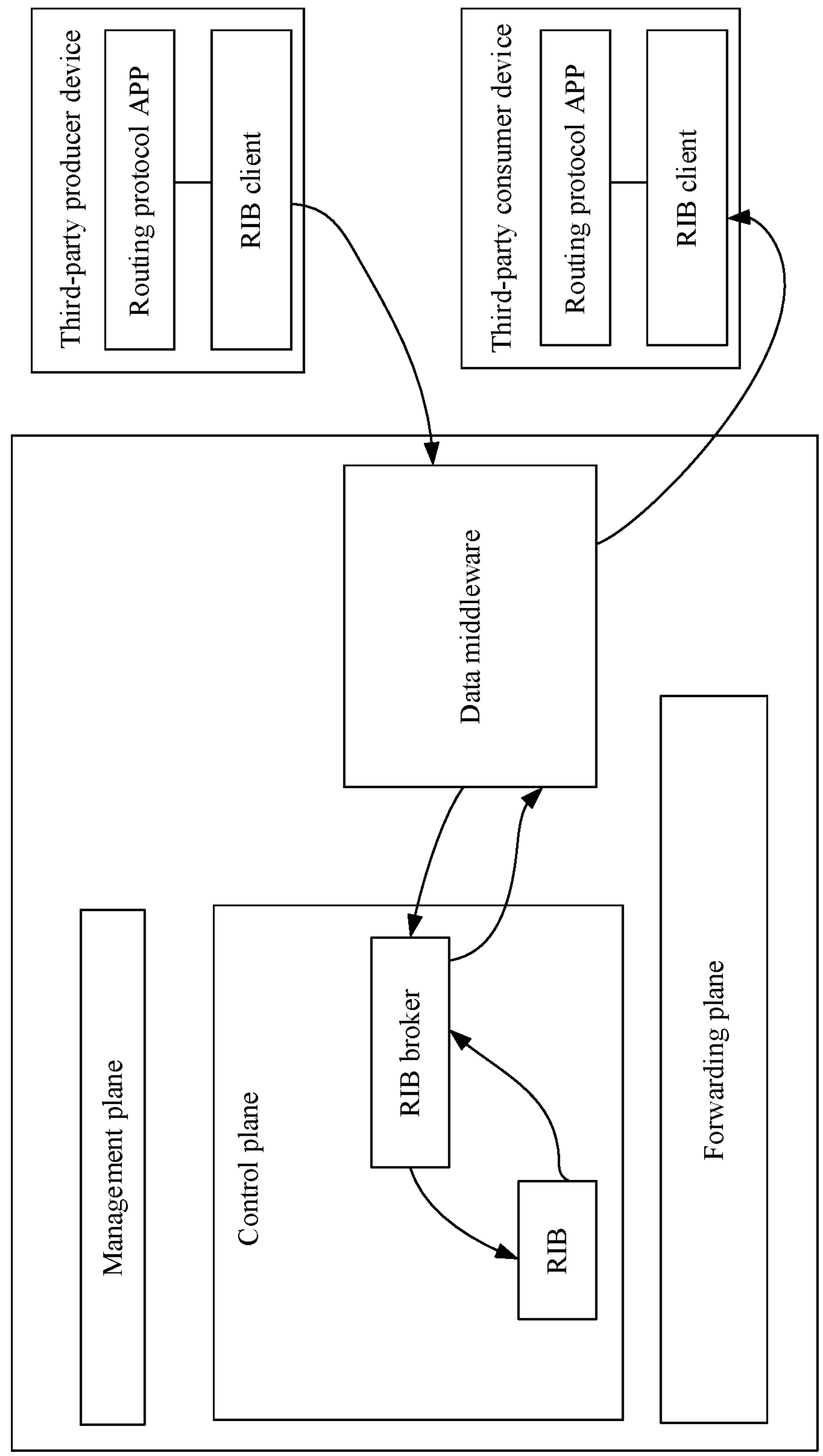
FIG. 1 is a diagram of an architecture of a communication system according to an embodiment of this application.

As shown in FIG. 1, the communication system includes a routing information base (RIB) and data middleware. The RIB communicates with the data middleware. The data middleware may also be referred to as a data broker. For example, the RIB may be a conventional internet protocol (IP) routing table, or a multiprotocol label switching (MPLS) label table. In addition to a RIB table, the RIB may further include a management module corresponding to the RIB table. Logical processing of the RIB in this application may be performed by the management module in the RIB. The RIB and the data middleware may be applications running in a network device. The data middleware has corresponding storage space for storing routing information. The RIB may have independent storage space for storing routing information, or may share storage space with the data middleware. The data middleware may alternatively be an independent network device or server.

The system may further include a control plane and a forwarding plane. The control plane may control the RIB to generate the routing information, perform route selection processing based on the routing information, and deliver preferred routing information to the forwarding plane, or send the generated routing information to the data middleware. The data middleware may store the received routing information, and open the stored routing information to a third-party consumer device. In addition, the data middleware may further receive and store routing information generated by an external third-party producer device, and send the routing information generated by the third-party producer device to the RIB. Correspondingly, the RIB may perform uniform preferred route selection processing based on the routing information generated by the third-party producer device and the routing information generated by the RIB.

To make interaction between the RIB and the data middleware more secure, a routing system may further include a RIB broker. All data exchange between the RIB and the data middleware may be implemented through the RIB broker. The RIB broker may be only an adaptation interface between the RIB and the data middleware, and has only an adaptation function. In addition to the adaptation function, the RIB broker may also have independent storage space. In this case, the RIB broker may decouple the RIB from the data middleware. Interaction between the RIB and the data middleware is divided into two processes: interaction between the RIB and the RIB broker and interaction between the RIB broker and the data middleware. The two interaction processes may run independently.

In addition, a routing protocol application (APP) may run in the foregoing third-party device (the third-party consumer device and/or the third-party producer device), and the routing protocol APP may generate, and/or consume or obtain the routing information in the data middleware. To make interaction between the routing protocol APP and the data middleware smoother, a RIB client may run in the third-party device, and the RIB client may be considered as an adaptation interface between the routing protocol APP and the data middleware. In addition, the third-party device may be considered as a device outside the routing system, or may be considered as a device in the routing system.

It should be noted that the third-party consumer device and the third-party producer device may be two third-party devices, or may be one third-party device. That is, there is a third-party device. The third-party device may be used as a producer to generate the routing information for the data middleware, or may be used as a consumer to consume or obtain the routing information from the data middleware.

For ease of understanding this application, the following separately describes in more detail the RIB broker, the data middleware, and the RIB client in this application.

1. Rib Broker:

(1) obtain the routing information from the data middleware and sends the routing information to the RIB, where the RIB performs uniform route selection based on all routes and generates a final preferred route selection result;

(2) obtain the routing information from the RIB, where the routing information may include preferred routing information or other non-preferred routing information, and send the obtained routing information to the middleware;

(3) check the routing information obtained from the data middleware, where the check includes validity check and capacity limit check; and convert a format of the routing information obtained from the data middleware into an internal format of the control plane; and (4) convert a format of the routing information obtained from the RIB into a format acceptable to the data middleware.

2. Data Middleware:

(1) Brief Descriptions of the Data Middleware:

The data middleware is different from a common message broker in the industry. The message broker is middleware oriented to a communication message, provides middleware for decoupling for both ends of message communication, and is essentially a communication channel between services. However, the data middleware is middleware oriented to service data between services, is an external data carrier set between a data producer and a data consumer to reduce running coupling, improve data reliability, and facilitate capacity expansion, and is essentially a data carrier that stores data produced by the producer.

Figure 2:
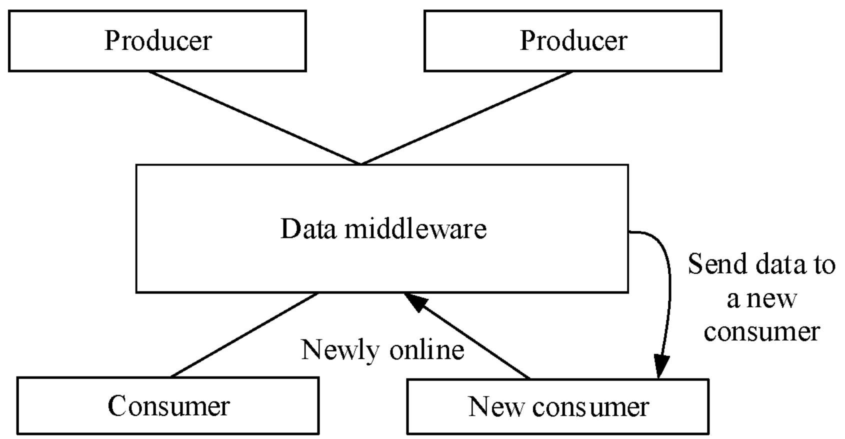
FIG. 2 is a schematic diagram of a function of data middleware according to an embodiment of this application.

Due to the foregoing features of the data middleware, as shown in FIG. 2, when a new consumer goes online, the producer does not need to be aware of the new consumer, and the data middleware only needs to send data from storage of the data middleware to the new consumer. However, the message broker functions only as the communication channel between the producer and the consumer. When a new consumer goes online, the producer needs to be aware of the new consumer, and the producer delivers data to the new consumer through the message broker.

(2) Functions of the Data Middleware:

The data middleware externally processes original data. Therefore, the data middleware needs to have a same data processing capability as that of non-external data middleware. In this way, the data middleware has the following functions:

supporting smooth data reconciliation to ensure data correctness and integrity;

supporting data aging to ensure data consistency in producer fault and restoration scenarios;

supporting batch historical data and real-time data synchronization and push when the consumer goes online;

supporting multi-copy data storage reliability; and supporting strong consistency or other consistency policies for multi-copy data.

Figure 3:
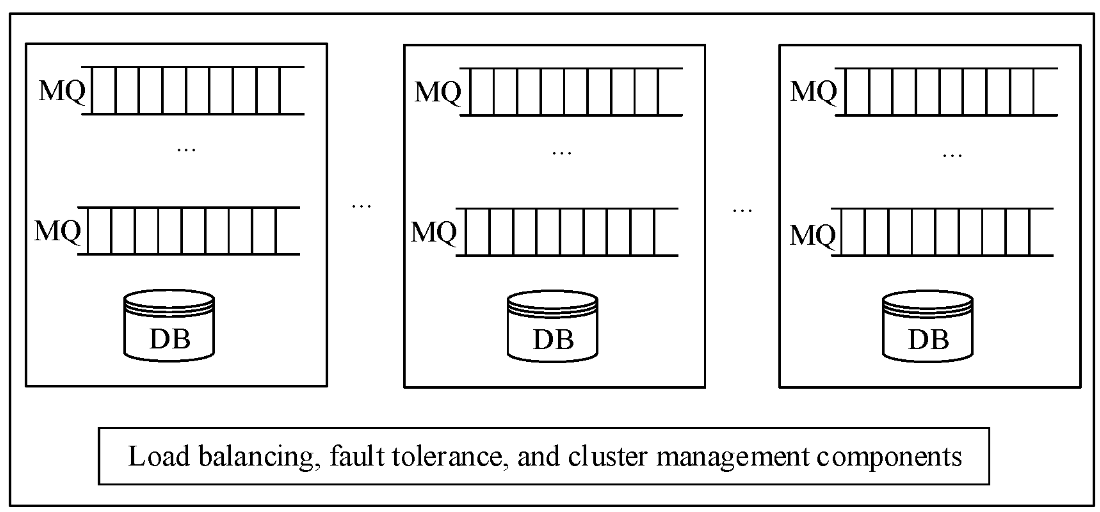
FIG. 3 is a schematic diagram of a structure of data middleware according to an embodiment of this application.

(3) Basic Composition of the Data Middleware, in an Example, May be Shown in FIG. 3:

Message queue (MQ): Data output is essentially communication. Therefore, the data middleware needs to have a basic message queue function.

Database (DB): external data storage medium. Provided that the DB is available, a new consumer does not need to re-request data from the producer after going online. Instead, the new consumer only needs to obtain the data from the DB and send the data to the newly online consumer.

Load balancing, fault tolerance, and cluster management components: To improve data reliability and performance, distributed multi-instance message queues and DBs are required. Therefore, the data middleware may also have a cluster and fault tolerance management system.

3. Rib Client:

The RIB client may be considered as an adaptation interface between the routing protocol APP and the data middleware, provides a standard interface for delivering and importing a route for the routing protocol APP, and shields the routing protocol APP from RIB deployment and specific implementation. Specific functions may be described as follows:

(1) the RIB Client Provides a Route Delivery Interface for the Routing Protocol APP;

supports the routing protocol APP in delivering routing information in batches and in real time;

when routes are advertised to the data middleware, supports packaging a plurality of routes into large packets, to improve delivery efficiency; and supports prefix-based delivery, where to be specific, a plurality of routes with a same prefix are delivered together during load balancing, to prevent the plurality of routes with a same prefix from being delivered for a plurality of times during load balancing.

(2) the RIB Client Provides a Route Import Interface for the Routing Protocol APP;

supports the routing protocol APP in importing routing information in batches and in real time; and supports prefix-based import, where to be specific, a plurality of routes with a same prefix are imported at the same time during load balancing, to prevent the plurality of routes with a same prefix from being imported for a plurality of times during load balancing.

Figure 4:
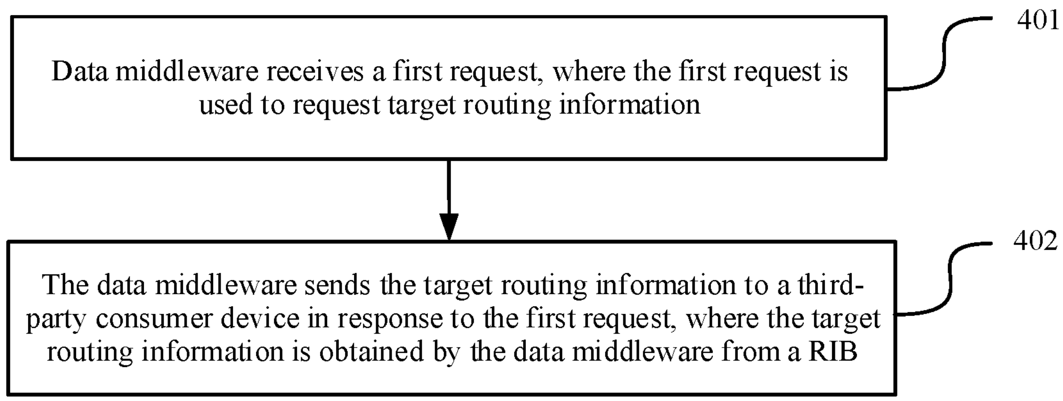
FIG. 4 is a flowchart of a routing information transmission method according to an embodiment of this application.

An embodiment of this application provides a routing information transmission method. As shown in FIG. 4, the method is applied to a system including data middleware and a RIB. The data middleware communicates with the RIB. The method may be performed by the data middleware, or may be performed by a device including the data middleware. The following describes a processing procedure of the method in detail with reference to a specific implementation. Content may be as follows:

Step 401: The data middleware receives a first request, where the first request is used to request target routing information.

The first request includes a smoothing request sent by a third-party consumer device, or a subscription request sent by a third-party consumer device, where the subscription request includes a target type, and the target type is a type of routing information subscribed to by the third-party consumer device from the data middleware. A routing protocol APP runs in the third-party consumer device, and the routing protocol APP may consume the routing information, for example, may be a routing security analysis APP and/or a routing change statistics and analysis APP. The target type may be routing information of a border gateway protocol (BGP) type or another type.

The third-party consumer device may send the smoothing request to the data middleware in at least the following three cases:

First, when being newly added as a consumer of the data middleware, the third-party consumer device may send the smoothing request to the data middleware, to send, to the third-party consumer device in batches, the routing information obtained by the data middleware before the third-party consumer device is successfully added as the consumer.

Second, when detecting that the stored routing information from the data middleware is exceptional (where for example, the routing information is lost), the third-party consumer device may send the smoothing request to the data middleware, to re-obtain the routing information stored in the data middleware. This ensures accuracy and integrity of the routing information obtained by the third-party consumer device.

Third, when a connection between the third-party consumer device and the data middleware is interrupted, the third-party consumer device cannot learn whether the data middleware obtains new routing information in an interruption process. In this way, after the connection is restored, the third-party consumer device may send the smoothing request to the data middleware, to obtain the routing information stored in the data middleware. This ensures accuracy and integrity of the routing information obtained by the third-party consumer device.

Step 402: The data middleware sends the target routing information to the third-party consumer device in response to the first request, where the target routing information is obtained by the data middleware from the RIB.

A type of the target routing information corresponds to the target type.

In the solution shown in this embodiment of this application, when the data middleware sends the target routing information to the third-party consumer device in response to the first request, a mechanism for sending the target routing information by the third-party consumer device varies based on a type of the first request.

For example, if the first request is the smoothing request sent by the third-party consumer device, after the data middleware receives the smoothing request sent by the third-party consumer device, the data middleware sends the routing information to the third-party consumer device based on the smoothing request in response to the smoothing request.

If the first request is the subscription request sent by the third-party consumer device, after receiving the subscription request sent by the third-party consumer device, the data middleware may immediately send stored target-type routing information to the third-party consumer device in response to the subscription request; or may periodically obtain target-type routing information from the RIB, and periodically send the target-type routing information to the third-party consumer device; or may perform an operation of combining immediate sending and periodic sending. For example, after receiving the subscription request, the data middleware first immediately sends all the stored target-type routing information to the third-party consumer device, and then sends target-type routing information that is newly obtained by the data middleware each time subsequently to the third-party consumer device in real time.

The target routing information is obtained by the data middleware from the RIB. The following describes an example of a process in which the data middleware obtains the routing information from the RIB.

When the data middleware obtains the routing information included in the RIB, the data middleware may obtain all the routing information included in the RIB, or may obtain only some specific types of routing information. For example, the data middleware subscribes to first-type routing information from the RIB. The data middleware obtains the first-type routing information included in the RIB. The first-type routing information may be BGP-type routing information or other-type routing information.

The data middleware may obtain the routing information included in the RIB in a manner of combining batch obtaining and real-time obtaining. For example, when being newly added as a consumer of the RIB, the data middleware first obtains historical routing information of the RIB in batches. In an example, a type of the historical routing information is a type of the routing information subscribed to by the data middleware from the RIB. Then, each time the RIB generates routing information subscribed to by the data middleware subsequently, the RIB sends the routing information to the data middleware in real time, and the data middleware obtains the routing information generated by the RIB in real time.

In addition, if detecting that the stored routing information is exceptional, the data middleware may re-obtain the routing information from the RIB, to ensure accuracy and integrity of the routing information stored in the data middleware. In this way, a corresponding processing process may be as follows: The data middleware sends a smoothing request to the RIB in response to an exception in the routing information stored in the data middleware. The data middleware obtains smooth routing information sent by the RIB based on the smoothing request, where the smooth routing information is the routing information sent by the RIB to the data middleware based on the smoothing request. Then, the data middleware may perform reconciliation processing based on the smooth routing information and the stored routing information, where the stored routing information is routing information stored before the smooth routing information is obtained. It should be additionally noted that the reconciliation processing may also be referred to as synchronization processing, smoothing processing, or the like, to align data in a producer and a consumer. The reconciliation processing may be either full reconciliation or incremental reconciliation. This is not limited in this application.

In addition, the data middleware may further store routing information from a third-party producer device, and the data middleware may further send the routing information from the third-party producer device to the third-party consumer device.

Interaction between the RIB and the data middleware may be direct interaction between the RIB and the data middleware, or may be implemented through a RIB broker. In an example, when the RIB interacts with the data middleware through the RIB broker, the data middleware may first request the routing information from the RIB broker. In response to the request, the RIB broker sends the routing information obtained from the RIB to the data middleware. In an example, the RIB broker may alternatively perform format conversion processing, for example, convert a format of the routing information received from the RIB into a format suitable for the data middleware, and then send the routing information to the data middleware.

Figure 5:
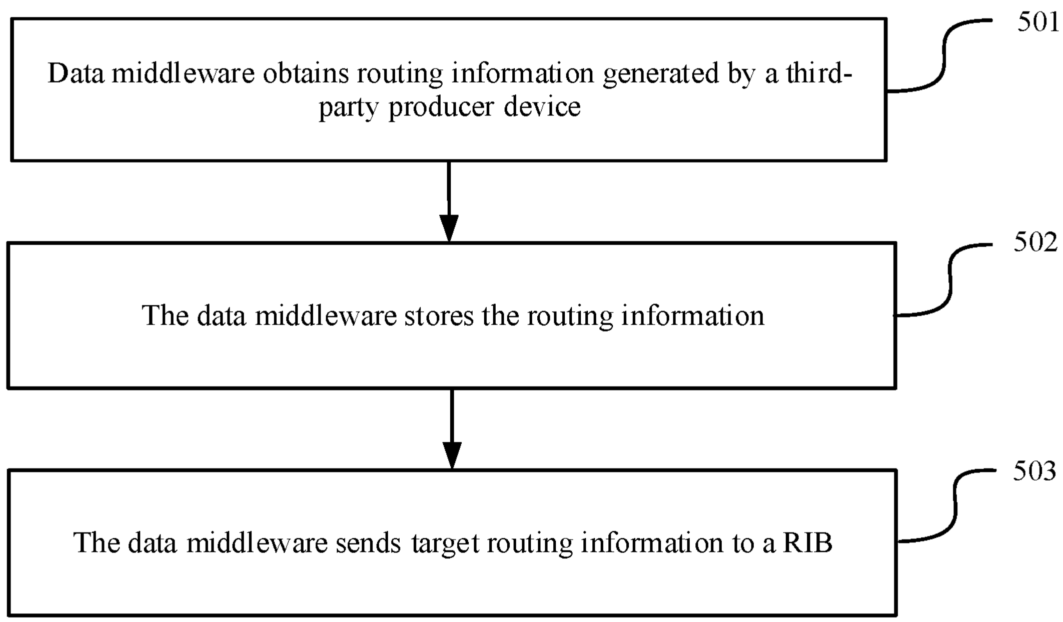
FIG. 5 is a flowchart of a routing information transmission method according to an embodiment of this application.

An embodiment of this application further provides a routing information transmission method. As shown in FIG. 5, the method is applied to a system including data middleware and a RIB. The data middleware communicates with the RIB. The method may be performed by the data middleware, or may be performed by a device including the data middleware. The following describes a processing procedure of the method in detail with reference to a specific implementation. Content may be as follows:

Step 501: The data middleware obtains routing information generated by a third-party producer device.

A routing protocol APP runs in the third-party producer device, and the routing protocol APP may generate the routing information.

In the solution shown in this embodiment of this application, the data middleware may first subscribe to the routing information from the third-party producer device, and then the data middleware obtains the routing information that is generated by the third-party producer device and that is subscribed to by the data middleware. When subscribing to the routing information, the data middleware may subscribe to all types of routing information generated by the third-party producer device, or may subscribe to a specific type of routing information (for example, a first type, where for example, the routing information may be BGP-type routing information).

The data middleware may obtain the routing information generated by the third-party producer device in a manner of combining batch obtaining and real-time obtaining. For example, when being newly added as a consumer of the third-party producer device, the data middleware first obtains historical routing information of the third-party producer device in batches. In an example, a type of the historical routing information is a type of the routing information subscribed to by the data middleware from the third-party producer device. Then, each time the third-party producer device generates routing information subscribed to by the data middleware, the third-party producer device sends the routing information to the data middleware in real time, and the data middleware obtains the routing information generated by the third-party producer device in real time.

Step 502: The data middleware stores the routing information.

In the solution shown in this embodiment of this application, after obtaining the routing information generated by the third-party producer device, the data middleware may store the obtained routing information.

If detecting that the routing information that is obtained from the third-party producer device and that is stored in the data middleware is exceptional, the data middleware may re-obtain the routing information from the third-party producer device. In this way, a corresponding processing process may be as follows: The data middleware sends a smoothing request to the third-party producer device in response to an exception in the routing information stored in the data middleware. The data middleware receives smooth routing information sent by the third-party producer device based on the smoothing request. The data middleware stores the smooth routing information, where the smooth routing information is the routing information sent by the third-party producer device to the data middleware based on the smoothing request.

In addition to sending the smoothing request to the third-party producer device when detecting that the stored routing information is exceptional, the data middleware may also send a smoothing request to the third-party producer device when establishing a connection to the third-party producer device. A specific processing process may be as follows: The data middleware sends the smoothing request to the third-party producer device in response to establishment of the connection between the data middleware and the third-party producer device. The data middleware receives the smooth routing information sent by the third-party producer device based on the smoothing request. The data middleware stores the smooth routing information, where the connection established may be a connection established for the first time, or may be a connection re-established after the connection is interrupted.

After obtaining the smooth routing information, the data middleware may perform reconciliation processing based on the smooth routing information and the stored routing information, where the stored routing information is routing information stored before the smooth routing information is obtained. In this way, integrity and accuracy of the routing information stored in the data middleware are ensured. It should be additionally noted that the reconciliation processing may also be referred to as synchronization processing, smoothing processing, or the like. The reconciliation processing may be either full reconciliation or incremental reconciliation. This is not limited in this application. For example, a fault occurs in communication between the third-party producer device and the data middleware. In a fault process, the third-party producer device may delete some data. After the communication is restored, the data is re-smoothed, and the data middleware detects that the smooth routing information is less than the stored routing information. Because the third-party producer device cannot send the deleted data to the data middleware again, the data middleware may delete a part of data that is in the stored routing information and that is more than the smooth routing information.

Step 503: The data middleware sends target routing information to the RIB.

In an example, each time after obtaining routing information generated by the third-party producer device, the data middleware may send newly obtained routing information to the RIB. In this example, the newly obtained routing information is the target routing information.

In another example, the data middleware may send the target routing information to the RIB in response to a received first request.

The first request includes a smoothing request sent by the RIB; or a subscription request sent by the RIB, where the subscription request includes a target type, and a type of the target routing information corresponds to the target type. For example, the target type may be a type of the routing information that is from the third-party producer device and that is stored in the data middleware, where for example, the routing information may be BGP-type routing information generated by the third-party producer device. Sending of the first request by the RIB may be performed by a management module included in the RIB.

The RIB may send the smoothing request to the data middleware in at least two cases:

First, when being newly added as a consumer of the data middleware, the RIB may send the smoothing request to the data middleware, to smooth, to the RIB in batches, the routing information obtained by the data middleware before the RIB is successfully added as the consumer.

Second, when detecting that the stored routing information from the data middleware is exceptional (where for example, the routing information is lost), the RIB may send the smoothing request to the data middleware, to re-obtain the routing information stored in the data middleware. This ensures integrity of the routing information obtained by the RIB.

In the solution shown in this embodiment of this application, when the data middleware sends the target routing information to a third-party consumer device in response to the first request, a mechanism for sending the target routing information by the third-party consumer device varies based on a type of the first request.

For example, if the first request is the smoothing request sent by the RIB, after the data middleware receives the smoothing request sent by the RIB, the data middleware sends the smooth routing information to the RIB based on the smoothing request in response to the smoothing request.

If the first request is the subscription request sent by the RIB, after receiving the subscription request sent by the RIB, the data middleware may immediately send stored target-type routing information to the RIB in response to the subscription request; or may periodically obtain target-type routing information from the third-party producer device, and periodically send the target-type routing information to the RIB; or may perform an operation of combining immediate sending and periodic sending. For example, after receiving the subscription request, the data middleware first immediately sends all the stored target-type routing information to the RIB, and then sends target-type routing information that is newly obtained by the data middleware each time subsequently to the RIB in real time.

Interaction between the RIB and the data middleware may be direct interaction between the RIB and the data middleware, or may be implemented through a RIB broker. In an example, when the RIB interacts with the data middleware through the RIB broker, because the routing information stored in the data middleware may be from the third-party producer device, security of the routing information is uncertain. Therefore, to ensure security of a routing system, processing such as checking and format conversion may be performed on the routing information from the data middleware through the RIB broker, and routing information that is qualified through the check and whose format is converted is sent to the RIB.

With reference to specific application scenarios, the following describes the technical solution provided in this embodiment of this application.

Figure 6:
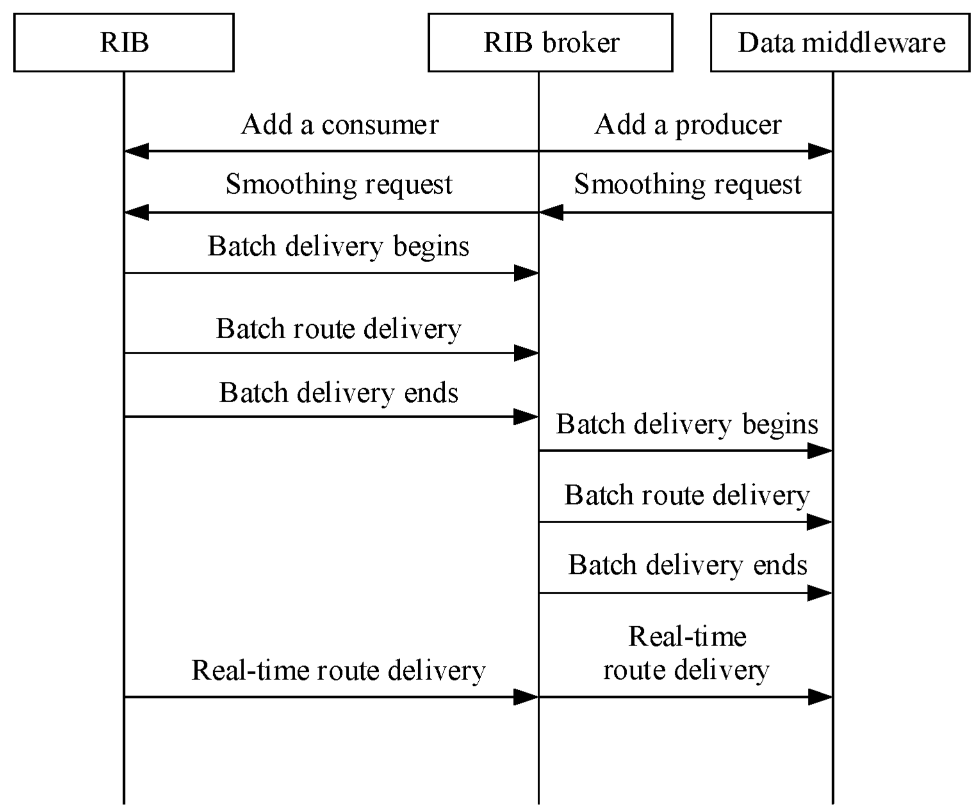
FIG. 6 is an interaction diagram of sending routing information by a RIB to data middleware according to an embodiment of this application.

1. The RIB delivers the routing information to the data middleware. This process may be implemented through the RIB broker. The following describes the process in which the RIB delivers the routing information to the data middleware with reference to FIG. 6.

(1) As a consumer of the RIB, the RIB broker subscribes to the routing information from the RIB, where the subscribed route may be all routing information included in the RIB, or may be some types of routing information included in the RIB, for example, BGP-type routing information.

(2) The RIB sends the routing information subscribed to by the RIB broker to the RIB broker.

(3) As a producer of the data middleware, the RIB broker sends the imported routing information to the data middleware. Before sending the routing information to the data middleware, the RIB broker may further perform format conversion on to-be-sent routing information, to convert a format of the routing information into a format acceptable to the data middleware.

It should be additionally noted that interaction between the RIB broker and the RIB and interaction between the RIB broker and the data middleware may be decoupled from each other. In this case, the RIB broker may have independent storage space to store the routing information.

Figure 7:
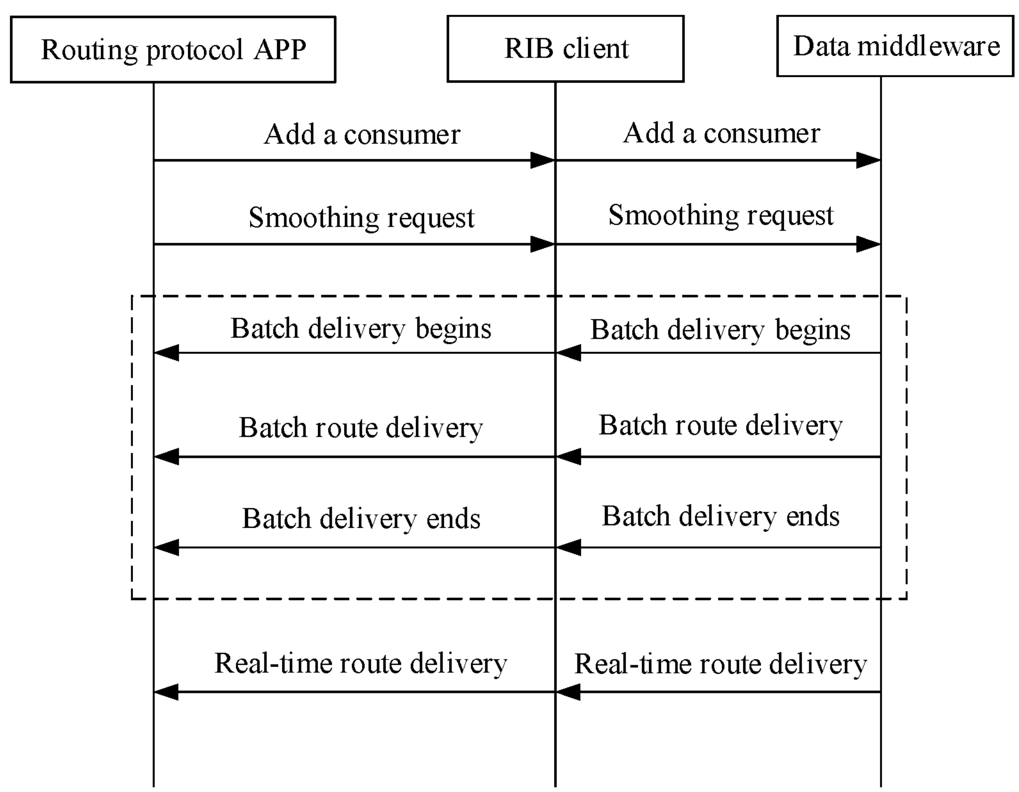
FIG. 7 is an interaction diagram of consuming routing information in data middleware by a third-party consumer device according to an embodiment of this application.

2. The third-party consumer device consumes the routing information in the data middleware. The following describes a process in which the third-party consumer device consumes the routing information in the data middleware with reference to FIG. 7.

(1) The third-party consumer device invokes an interface provided by a RIB client through a running routing protocol APP (where the routing protocol can consume the routing information) to add a consumer, to indicate that the routing information is to be consumed.

(2) After receiving a consumer adding request sent by the routing protocol APP, the RIB client adds the consumer to the data middleware; and notifies the routing protocol APP after the addition is successful.

(3) The data middleware receives the consumer adding request, creates routing protocol APP table information, and sends a smoothing request to the routing protocol APP through the RIB client.

(4) The RIB client receives the smoothing request sent by the routing protocol APP, and sends the smoothing request to the data middleware, to trigger the data middleware to send, to the routing protocol APP in batches, the routing information (which may be all the routing information in the data middleware or some specific types of routing information) before the consumer is added this time.

(5) The data middleware sends, to the routing protocol APP in batches, the routing information before the consumer is successfully added this time. For example, a process in which the data middleware sends the routing information to the routing protocol APP may be described as follows:

The data middleware sends a message that “batch delivery begins” to the routing protocol APP through the RIB client. After receiving the message that “batch delivery begins”, the first routing protocol APP determines that a smoothing process of the routing information begins. “Batch delivery begins” is a message indicating that the smoothing process begins.

The data middleware delivers the routing information in batches to the routing protocol APP through the RIB client.

After smoothing the routing information to be smoothed this time, the data middleware sends a message that “batch delivery ends” to the routing protocol APP through the RIB client. “Batch delivery ends” is a message indicating that the smoothing process ends.

(6) The routing protocol APP processes the received routing information, for example, performs routing security analysis and routing change statistics and analysis, or sends the routing information to another consumer device.

(7) Each time the data middleware obtains routing information subscribed to by the third-party consumer device, the data middleware delivers the routing information to the third-party consumer device through a real-time route import interface of the RIB client.

Figure 8:
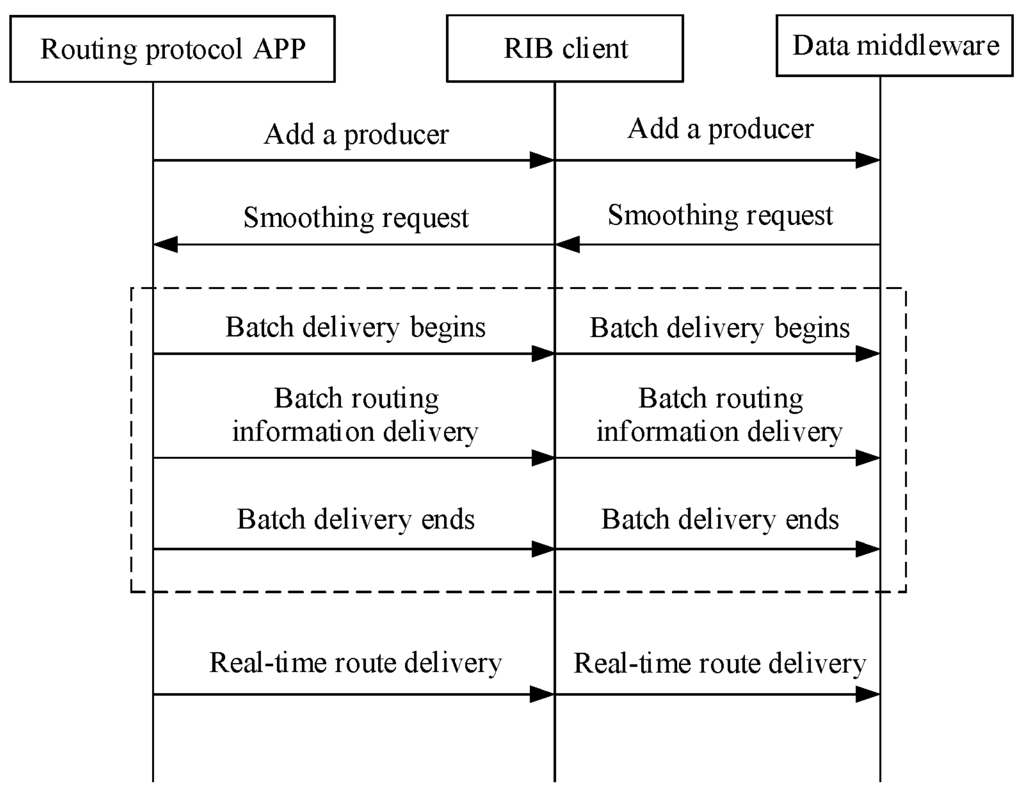
FIG. 8 is an interaction diagram of delivering routing information by a third-party producer device to data middleware according to an embodiment of this application.

3. The third-party producer device delivers the routing information to the data middleware. The following describes a process in which the third-party producer device delivers the routing information with reference to FIG. 8.

(1) The third-party producer device invokes an interface provided by a RIB client through a running routing protocol APP (where the routing protocol APP can generate the routing information) to add a producer, to indicate that the routing information is to be generated.

(2) After receiving a producer adding request sent by the routing protocol APP, the RIB client adds the producer to the data middleware; and notifies the routing protocol APP after the addition is successful.

(3) The data middleware receives the producer adding request from the routing protocol APP, creates routing protocol APP table information, and initiates a smoothing request to the routing protocol APP through the RIB client.

(4) The RIB client receives the smoothing request sent by the data middleware, and sends the smoothing request to the routing protocol APP, to trigger the routing protocol APP to smooth, to the data middleware in batches, the routing information (which may be all the routing information generated by the routing protocol APP or some specific types of routing information) before the producer is added this time.

(5) The routing protocol APP smoothes, to the data middleware in batches, the routing information before the producer is successfully added this time. For example, a process in which the routing protocol APP smoothes the routing information to the data middleware may be described as follows:

The routing protocol APP sends a message that "batch delivery begins" to the data middleware through the RIB client. After receiving the message that "batch delivery begins", the data middleware determines that a smoothing process of the routing information begins. "Batch delivery begins" is a message indicating that the smoothing process begins.

The routing protocol APP delivers the routing information to the data middleware in batches through the RIB client.

After smoothing the routing information to be smoothed this time, the routing protocol APP sends a message that "batch delivery ends" to the data middleware through the RIB client. "Batch delivery ends" is a message indicating that the smoothing process ends.

After receiving the message that "batch delivery ends", the data middleware determines that the smoothing this time ends.

(6) The data middleware stores the routing information smoothed by the routing protocol APP. It should be additionally noted that the data middleware supports ensuring data reliability. If a data loss occurs or the data middleware is faulty, the smoothing request is triggered to be sent to the routing protocol APP and/or the RIB, to trigger data restoration.

(7) Each time the routing protocol APP generates the routing information subscribed to by the data middleware, a real-time route delivery interface provided by the RIB client is invoked to deliver the routing information to the data middleware in real time.

Figure 9:
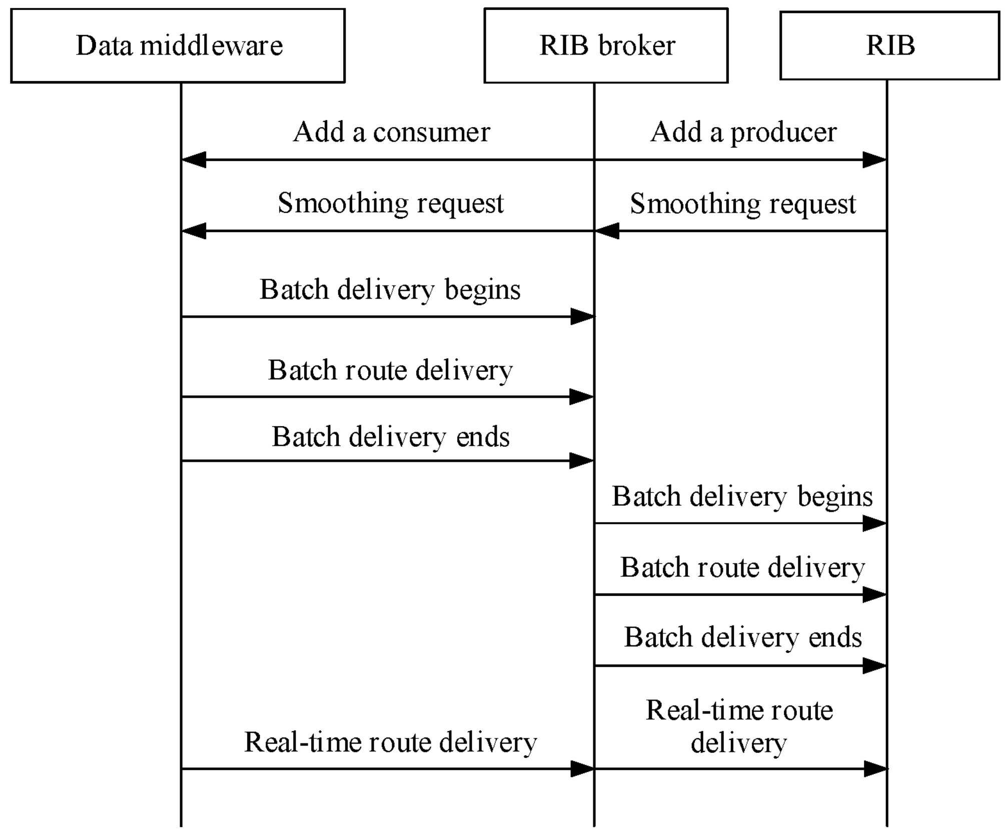
FIG. 9 is an interaction diagram of consuming routing information in data middleware by a RIB according to an embodiment of this application.

4. The RIB consumes the routing information in the data middleware. The following describes a process in which the RIB consumes the routing information in the data middleware with reference to FIG. 9.

(1) As a consumer of the data middleware, the RIB broker subscribes to the routing information in the data middleware, for example, subscribes to the routing information that is generated by the third-party producer device and that is stored in the data middleware.

(2) When the data middleware creates the RIB broker as the consumer, the data middleware pushes historical routing information to the RIB, where the historical routing information may be the routing information obtained from the third-party producer device. Subsequently, when re-obtaining the routing information subscribed to by the RIB, the data middleware pushes the routing information to the RIB broker in real time.

(3) As a producer of the RIB, the RIB broker delivers the consumed routing information from the data middleware to the RIB. In addition, the RIB broker checks compliance of the routing information obtained from the data middleware, and converts a format of the routing information into an internal format of the control plane.

(4) As a consumer of the RIB broker, the RIB receives the routing information from the RIB broker, and performs uniform route selection based on the routing information (including the routing information generated by the RIB and the routing information generated by the third-party producer device).

It should be additionally noted that interaction between the RIB broker and the RIB and interaction between the RIB broker and the data middleware may be decoupled from each other. In this case, the RIB broker has independent storage space to store the routing information.

The foregoing describes the routing information transmission methods shown in embodiments of this application. The following describes routing information transmission apparatuses in embodiments of this application. The routing information transmission apparatuses described below may implement any function in any one of the foregoing routing information transmission methods.

Figure 10:
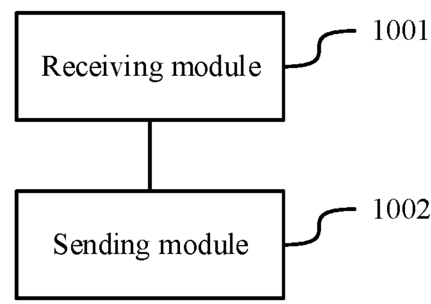
FIG. 10 is a schematic diagram of a structure of a routing information transmission apparatus according to an embodiment of this application.

FIG. 10 is a schematic diagram of a structure of a routing information transmission apparatus according to an embodiment of this application. As shown in FIG. 10, the routing information transmission apparatus includes a data middleware module, and the data middleware module may include:

a receiving module 1001, configured to receive a first request, where the first request is used to request target routing information; and a sending module 1002, configured to send the target routing information to a third-party consumer device in response to the first request, where the target routing information is obtained by the data middleware from a RIB.

In a possible implementation, the sending module 1002 is further configured to send a smoothing request to the RIB in response to an exception in stored routing information; and the data middleware further includes an obtaining module and a storage module, where the obtaining module is configured to obtain smooth routing information sent by the RIB based on the smoothing request; and the storage module is configured to store the smooth routing information.

In a possible implementation, the data middleware further includes a reconciliation module, configured to:

perform reconciliation processing based on the smooth routing information and the stored routing information, where the stored routing information is routing information stored before the smooth routing information is obtained.

In a possible implementation, the data middleware further includes a subscription module, configured to subscribe to first-type routing information from the RIB; and the data middleware further includes the obtaining module, where the obtaining module is configured to obtain the first-type routing information included in the RIB, where the first-type routing information includes the target routing information.

In a possible implementation, the apparatus further includes the RIB.

In a possible implementation, the apparatus further includes a RIB broker, and the data middleware communicates with the RIB through the RIB broker.

It should be noted that the receiving module 1001, the sending module 1002, the obtaining module, the storage module, the reconciliation module, and the subscription module may be implemented by a processor, or implemented by a processor in cooperation with a memory, or implemented by a processor by executing program instructions in a memory.

When the routing information transmission apparatus transmits the routing information, division of the foregoing functional modules is merely used as an example for description. During actual application, the foregoing functions may be allocated to different functional modules for implementation as required. In other words, an internal structure of the routing information transmission apparatus is divided into different functional modules, to implement all or a part of the functions described above. In addition, the routing information transmission apparatus provided in the foregoing embodiment and the routing information transmission method shown in FIG. 4, FIG. 6, FIG. 7, or FIG. 9 belong to a same concept. For a specific implementation process thereof, refer to the corresponding method part. Details are not described herein again.

Figure 11:
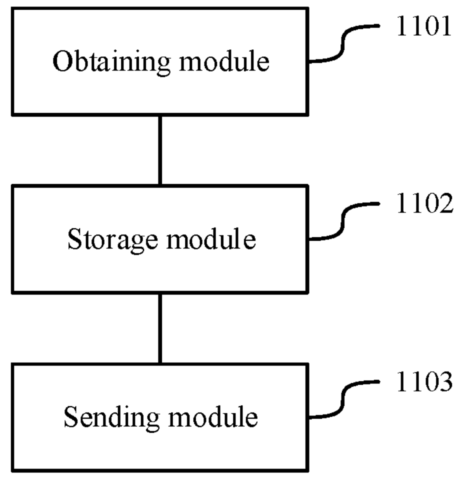
FIG. 11 is a schematic diagram of a structure of another routing information transmission apparatus according to an embodiment of this application.

FIG. 11 is a schematic diagram of a structure of another routing information transmission apparatus according to an embodiment of this application. As shown in FIG. 11, the routing information transmission apparatus includes a data middleware module, and the data middleware module may include:

- an obtaining module 1101, configured to obtain routing information generated by a third-party producer device;
- a storage module 1102, configured to store the obtained routing information; and
- a sending module 1103, configured to send target routing information to a RIB.

In a possible implementation, before sending the target routing information to the RIB, the obtaining module 1102 is further configured to receive a first request, where the first request is used to request the target routing information from the data middleware; and the first request includes a smoothing request sent by the RIB; or a subscription request sent by the RIB, where the subscription request includes a target type, and a type of the target routing information corresponds to the target type.

In a possible implementation, the sending module 1103 is further configured to send a smoothing request to the third-party producer device in response to an exception in the stored routing information;

- the obtaining module 1101 is further configured to receive smooth routing information sent by the third-party producer device based on the smoothing request; and
- the storage module 1102 is further configured to store the smooth routing information.

In a possible implementation, the sending module 1103 is further configured to send a smoothing request to the third-party producer device in response to establishment of a connection to the third-party producer device;

- the obtaining module 1101 is configured to receive smooth routing information sent by the third-party producer device based on the smoothing request; and
- the storage module 1102 is further configured to store the smooth routing information.

In a possible implementation, the routing information corresponds to a first type, and the sending module 1103 is further configured to send a subscription request to the third-party producer device, where the subscription request includes the first type, and the subscription request is used to request the routing information corresponding to the first type.

In a possible implementation, the apparatus further includes the RIB.

In a possible implementation, the apparatus further includes a RIB broker, and the data middleware communicates with the RIB through the RIB broker.

It should be noted that the obtaining module 1101, the storage module 1102, and the sending module 1103 may be implemented by a processor, or implemented by a processor in cooperation with a memory, or implemented by a processor by executing program instructions in a memory.

When the routing information transmission apparatus transmits the routing information, division of the foregoing functional modules is merely used as an example for description. During actual application, the foregoing functions may be allocated to different functional modules for implementation as required. In other words, an internal structure of the routing information transmission apparatus is divided into different functional modules, to implement all or a part of the functions described above. In addition, the routing information transmission apparatus provided in the foregoing embodiment and the routing information transmission method shown in FIG. 5, FIG. 8, or FIG. 9 belong to a same concept. For a specific implementation process thereof, refer to the corresponding method part. Details are not described herein again.

In correspondence to the method embodiments and the virtual apparatus embodiments provided in this application, an embodiment of this application further provides a network device. The following describes a hardware structure of the network device.

A network device 1200 or a network device 1300 described below may be configured to implement any one of the foregoing routing information transmission methods. Hardware and modules in the network device 1200 or the network device 1300 and the foregoing other operations and/or functions are separately used to implement various steps and methods in the method embodiments. For specific details of a detailed procedure about how the network device 1200 or the network device 1300 transmits routing information, refer to the foregoing method embodiments. For brevity, details are not described herein again. The steps of any one of the foregoing routing information transmission methods are implemented by using an integrated logic circuit of hardware in a processor of the network device 1200 or the network device 1300 or by using instructions in a form of software. The steps of the methods disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

The network device 1200 or the network device 1300 corresponds to any one of the foregoing routing information transmission apparatuses in the foregoing virtual apparatus embodiments. Each functional module of the foregoing routing information transmission apparatus is implemented by using software of the network device 1200 or the network device 1300. In other words, the functional module included in the routing information transmission apparatus is generated after the processor of the network device 1200 or the network device 1300 reads the program code stored in the memory.

Figure 12:
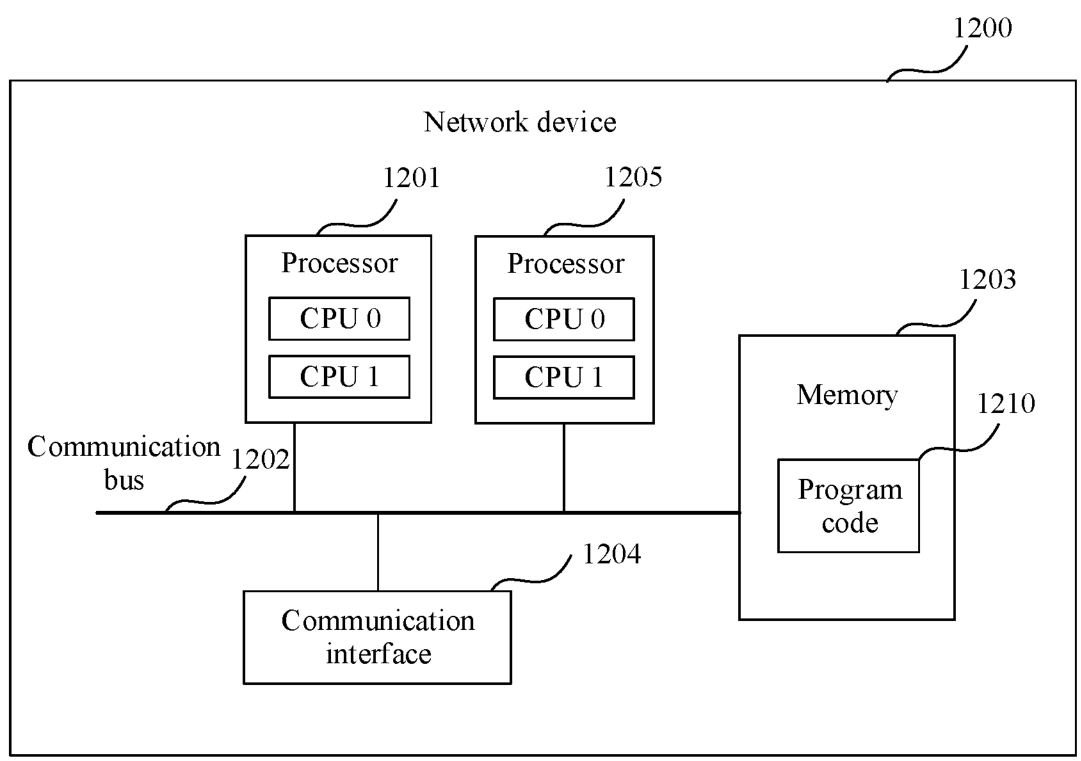
FIG. 12 is a schematic diagram of a structure of a network device according to an embodiment of this application.

FIG. 12 is a schematic diagram of a structure of a network device 1200 according to an example embodiment of this application. The network device 1200 may include the foregoing data middleware, and the network device 1200 may implement any one of the foregoing routing information transmission methods. The network device 1200 may be implemented by using a general bus architecture. In addition, the network device 1200 may further include a RIB.

The network device 1200 includes at least one processor 1201, a communication bus 1202, a memory 1203, and at least one communication interface 1204.

The processor 1201 may be a general-purpose CPU, an NP, a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof.

The communication bus 1202 is configured to transmit information between the foregoing components. The communication bus 1202 may be classified into an address bus, a data bus, a control bus, and the like. For ease of representation, only one thick line is used to represent the bus in the figure, but this does not mean that there is only one bus or only one type of bus.

The memory 1203 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a Blu-ray optical disc, or the like), a magnetic disk storage medium or another magnetic storage device, or any other medium capable of carrying or storing expected program code in a form of instructions or a data structure and capable of being accessed by a computer. However, the memory 1203 is not limited thereto. The memory 1203 may exist independently, and is connected to the processor 1201 through the communication bus 1202. Alternatively, the memory 1203 may be integrated with the processor 1201.

The communication interface 1204 is configured to communicate with another device or a communication network through any apparatus such as a transceiver. The communication interface 1204 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

During specific implementation, in an embodiment, the processor 1201 may include one or more CPUs, for example, a CPU 0 and a CPU 1 shown in FIG. 12.

During specific implementation, in an embodiment, the network device 1200 may include a plurality of processors, for example, the processor 1201 and a processor 1205 shown in FIG. 12. Each of the processors may be a single-core processor (single-CPU) or may be a multi-core processor (multi-CPU). The processor herein may be one or more devices, circuits, and/or processing cores configured to process data (for example, computer program instructions).

During specific implementation, in an embodiment, the network device 1200 may further include an output device 1206 and an input device 1207. The output device 1206 communicates with the processor 1201, and may display information in a plurality of manners. For example, the output device 1206 may be a liquid crystal display (LCD), a light emitting diode (LED) display device, a cathode ray tube (CRT) display device, a projector, or the like. The input device 1207 communicates with the processor 1201, and may receive an input from a user in a plurality of manners. For example, the input device 1207 may be a mouse, a keyboard, a touchscreen device, a sensor device, or the like.

In some embodiments, the memory 1203 is configured to store program code 1210 for executing the solutions of this application, and the processor 1401 may execute the program code 1210 stored in the memory 1203. In other words, the network device 1200 may implement, through the processor 1201 and the program code 1210 in the memory 1203, any one of the routing information transmission methods provided in the method embodiments.

The network device 1200 in this embodiment of this application may implement any one of the foregoing routing information transmission methods, and the processor 1201, the communication interface 1204, and the like in the network device 1200 may implement various steps and methods in the foregoing method embodiments. For brevity, details are not described herein again.

The receiving module 1001, the sending module 1002, the obtaining module, and the subscription module in the routing information transmission apparatus shown in FIG. 10 are equivalent to the communication interface 1204 in the network device 1200; the reconciliation module in the routing information transmission apparatus may be equivalent to the processor 1201 in the network device 1200; and the storage module in the routing information transmission apparatus may be equivalent to the memory 1203 in the network device 1200.

The obtaining module 1101 and the sending module 1103 in the routing information transmission apparatus shown in FIG. 11 are equivalent to the communication interface 1204 in the network device 1200; and the storage module 1102 in the routing information transmission apparatus may be equivalent to the memory 1203 in the network device 1200.

Figure 13:
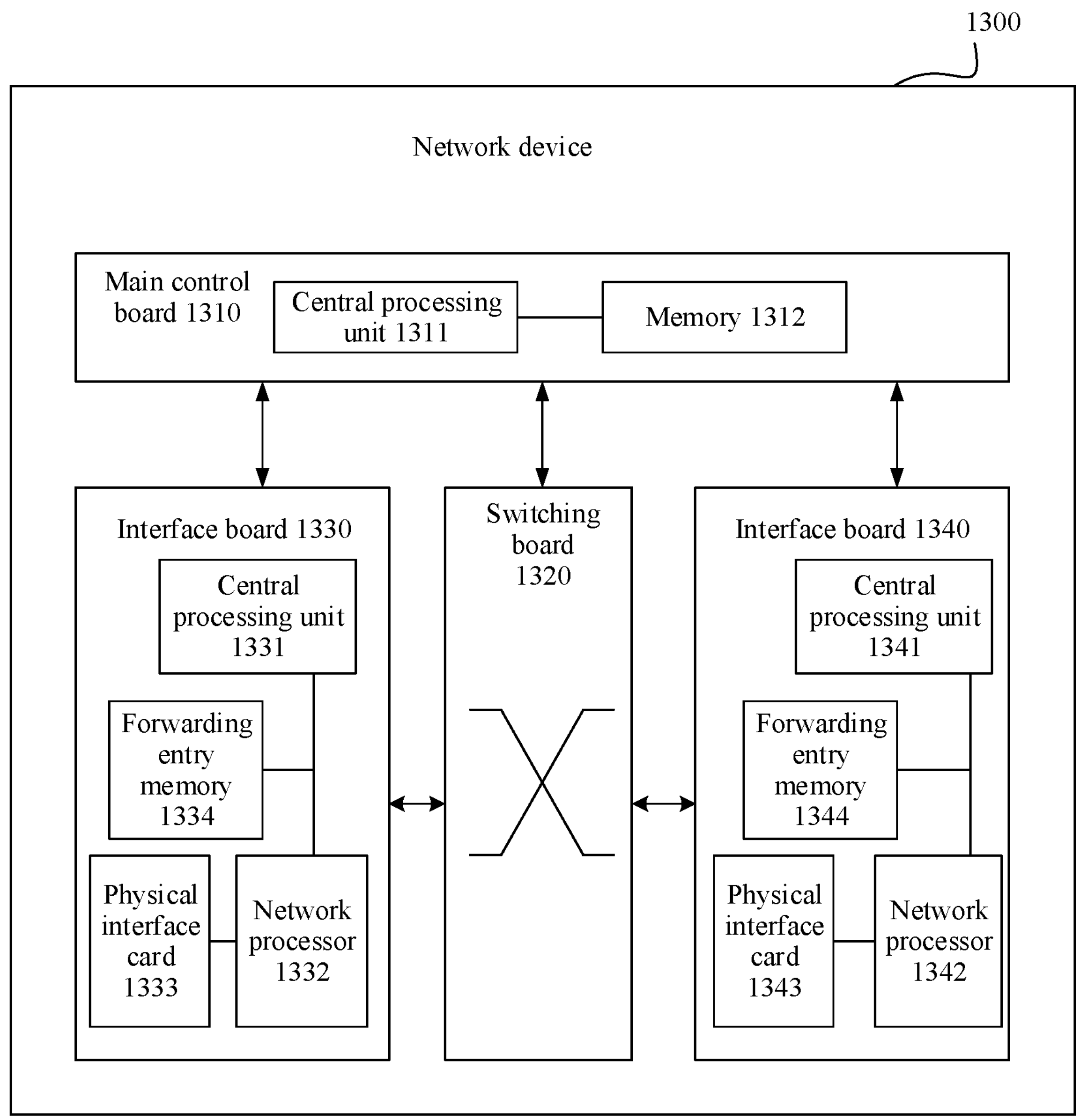
FIG. 13 is a schematic diagram of a structure of another network device according to an embodiment of this application.

FIG. 13 is a schematic diagram of a structure of a network device 1300 according to an example embodiment of this application. The network device 1300 may include the foregoing data middleware, or may be the foregoing data middleware. The network device 1300 may implement any one of the foregoing routing information transmission methods. The network device 1300 includes a main control board 1310 and an interface board 1330. In addition, the network device 1300 may further include a RIB.

The main control board 1310 is also referred to as a main processing unit (MPU) or a route processor card. The main control board 1310 is configured to control and manage components in the network device 1300, including functions such as routing calculation, device management, device maintenance, and protocol processing. The main control board 1310 includes a central processing unit 1311 and a memory 1312.

The interface board 1330 is also referred to as a line processing unit (LPU), a line card, or a service board. The interface board 1330 is configured to: provide various service interfaces, and forward a data packet. The service interface includes but is not limited to an Ethernet interface, a POS (Packet over SONET/SDH) interface, and the like. The Ethernet interface is, for example, a flexible Ethernet service interface (Flexible Ethernet Client, FlexE Client). The interface board 1330 includes a central processing unit 1331, a network processor 1332, a forwarding entry memory 1334, and a physical interface card (PIC) 1333.

The central processing unit 1331 on the interface board 1330 is configured to: control and manage the interface board 1330, and communicate with the central processing unit 1311 on the main control board 1310.

The network processor 1332 is configured to forward a packet. A form of the network processor 1332 may be a forwarding chip. Specifically, the network processor 1332 is configured to forward a received packet based on a forwarding table stored in the forwarding entry memory 1334. If a destination address of the packet is an address of the network device 1300, the network processor 1332 sends the packet to a central processing unit (CPU) (for example, the central processing unit 1311) for processing. If a destination address of the packet is not an address of the network device 1300, the network processor 1332 searches for, based on the destination address, a next hop and an outbound interface corresponding to the destination address in the forwarding table, and forwards the packet to the outbound interface corresponding to the destination address. Uplink packet processing includes packet inbound interface processing and forwarding table searching; and downlink packet processing includes forwarding table searching and the like.

The physical interface card 1333 is configured to implement a physical layer interconnection function. Original traffic enters the interface board 1330 from the physical interface card 1333, and a processed packet is sent out from the physical interface card 1333. The physical interface card 1333, also referred to as a subcard, may be installed on the interface board 1330, and is responsible for converting an optical/electrical signal into a packet, performing validity check on the packet, and then forwarding the packet to the network processor 1332 for processing. In some embodiments, the central processing unit may also perform a function of the network processor 1332, for example, implement software forwarding based on a general-purpose CPU, so that the network processor 1332 is not required in the physical interface card 1333.

Optionally, the network device 1300 includes a plurality of interface boards. For example, the network device 1300 further includes an interface board 1340. The interface board 1340 includes a central processing unit 1341, a network processor 1342, a forwarding entry memory 1344, and a physical interface card 1343.

Optionally, the network device 1300 further includes a switching board 1320. The switching board 1320 may also be referred to as a switch fabric unit (SFU). When the network device has the plurality of interface boards 1330, the switching board 1320 is configured to complete data exchange between the interface boards. For example, the interface board 1330 and the interface board 1340 may communicate with each other through the switching board 1320.

The main control board 1310 is coupled to the interface board 1330. For example, the main control board 1310, the interface boards 1330 and 1340, and the switching board 1320 are connected to a system backplane through a system bus to communicate with each other. In a possible implementation, an inter-process communication (IPC) channel is established between the main control board 1310 and the interface board 1330, and the main control board 1310 communicates with the interface board 1330 through the IPC channel.

Logically, the network device 1300 includes a control plane and a forwarding plane. The control plane includes the main control board 1310 and the central processing unit 1331. The forwarding plane includes components used for forwarding, for example, the forwarding entry memory 1334, the physical interface card 1333, and the network processor 1332. The control plane performs functions such as routing, generating a forwarding table, processing signaling and a protocol packet, and configuring and maintaining a device status. The control plane delivers the generated forwarding table to the forwarding plane. On the forwarding plane, the network processor 1332 searches the forwarding table delivered by the control plane to forward a packet received by the physical interface card 1333. The forwarding table delivered by the control plane may be stored in the forwarding entry memory 1334. In some embodiments, the control plane and the forwarding plane may be completely separated, and are not on a same device.

The receiving module 1001, the sending module 1002, the obtaining module, and the subscription module in the routing information transmission apparatus shown in FIG. 10 are equivalent to the physical interface card 1333 in the network device 1300; the reconciliation module in the routing information transmission apparatus may be equivalent to the network processor 1332 or the central processing unit 1311 in the network device 1300; and the storage module in the routing information transmission apparatus may be equivalent to the memory 1312 or the forwarding entry memory 1334 in the network device 1300.

The obtaining module 1101 and the sending module 1103 in the routing information transmission apparatus shown in FIG. 11 are equivalent to the physical interface card 1333 in the network device 1300; and the storage module 1102 in the routing information transmission apparatus may be equivalent to the memory 1312 or the forwarding entry memory 1334 in the network device 1300.

Operations performed on the interface board 1540 are consistent with the operations performed on the interface board 1530 in this embodiment of this application. For brevity, details are not described. The network device 1500 in this embodiment may correspond to the data middleware in the foregoing method embodiments, and the main control board 1510, the interface board 1530, and/or the interface board 1540 in the network device 1500 may implement functions of the data middleware and/or various steps implemented by the data middleware in the foregoing method embodiments. For brevity, details are not described herein again.

It should be noted that, there may be one or more main control boards; when there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented through the switching board, to provide a large-capacity data exchange and processing capability. Therefore, a data access and processing capability of the network device in the distributed architecture is better than that of the device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained by combining the two central processing units. The device in this form (for example, a network device such as a low-end switch or router) has a weak data exchange and processing capability. A specific architecture that is to be used depends on a specific networking deployment scenario. This is not limited herein.

In some possible embodiments, the foregoing routing information transmission method may alternatively be implemented by a virtualization device, and the virtualization device may be data middleware, or may include data middleware. In addition, the virtualization device may further include a RIB.

For example, the virtualization device may be a virtual machine (VM) on which a program having a routing information transmission function runs, and the virtual machine is deployed on a hardware device (for example, a physical server). The virtual machine is a complete software-simulated computer system that has complete hardware system functions and that runs in an entirely isolated environment. A container may be configured as the network device that can perform the foregoing routing information transmission methods. For example, the network device that can perform the foregoing routing information transmission methods may be implemented based on a general-purpose physical server in combination with a network functions virtualization (NFV) technology. The network device may be a virtual host, a virtual router, or a virtual switch. After reading this application, with reference to the NFV technology, a person skilled in the art may virtualize, on the general-purpose physical server, the network device having the foregoing routing information transmission function. Details are not described herein again.

For example, the virtualization device may be a container, and the container is an entity configured to provide an isolated virtualization environment. For example, the container may be a docker container. The container may be configured as the network device that can perform the foregoing routing information transmission methods. For example, the network device may be created by using a corresponding image. When a container technology is used for implementation, the network device may run by using a kernel of a physical machine, and a plurality of network devices may share an operating system of the physical machine. Different network devices may be isolated by using the container technology. A containerized network device may run in a virtualization environment, for example, may run in a virtual machine, or the containerized network device may directly run in a physical machine.

For example, the virtualization device may be a pod. The pod is a basic unit of Kubernetes (where Kubernetes is an open-source container orchestration engine of Google®, and is briefly referred to as K8s in English) for deploying, managing, and orchestrating a containerized application. The pod may include one or more containers. All containers in a same pod are usually deployed on a same host. Therefore, all the containers in the same pod may communicate with each other through the host, and may share storage resources and network resources of the host. The pod may be configured as the network device that can perform any one of the foregoing routing information transmission methods. For example, specifically, a container as a service (CaaS), which is a container-based platform as a service (PaaS), may be indicated to create the pod, and the pod is provided as the network device.

Certainly, any one of the foregoing routing information transmission methods may alternatively be implemented by another virtualization device, which is not listed one by one herein.

In some possible embodiments, the foregoing routing information transmission methods may alternatively be implemented by a general-purpose processor. The general-purpose processor may be data middleware, or may include data middleware. In addition, the general-purpose processor may further include a RIB. For example, the general-purpose processor may be in a form of a chip. Specifically, the general-purpose processor includes a processing circuit, and an input interface and an output interface that are internally connected to and communicate with the processing circuit. The processing circuit is configured to perform various steps of transmitting routing information in the foregoing method embodiments. The processing circuit is configured to perform receiving or obtaining steps in the foregoing method embodiments through the input interface. The processing circuit is configured to perform sending steps in the foregoing method embodiments through the output interface. Optionally, the general-purpose processor may further include a storage medium. The processing circuit is configured to perform the storage steps in the foregoing method embodiments through the storage medium. The storage medium may store instructions executed by the processing circuit. The processing circuit is configured to execute the instructions stored in the storage medium, to perform the foregoing method embodiments.

Figure 14:
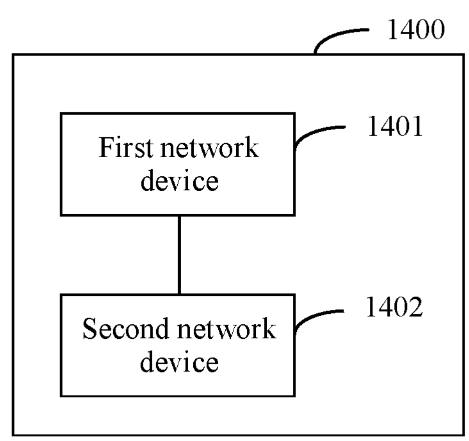
FIG. 14 is a schematic diagram of a communication system according to an embodiment of this application.

Refer to FIG. 14. An embodiment of this application provides a communication system 1400. The communication system 1400 includes a first network device 1401 and a second network device 1402. The first network device 1401 includes the data middleware described in any one of the foregoing apparatus embodiments, and the second network device 1402 includes the RIB.

In a possible implementation, the communication system 1400 may further include a third-party producer device and/or a third-party consumer device.

An embodiment of this application further provides a communication system. The communication system includes a first network device, and the first network device includes any one of the foregoing routing information transmission apparatuses.

In a possible implementation, the first network device further includes a RIB.

In a possible implementation, the communication system further includes a third-party producer device, and the third-party producer device is configured to deliver routing information to data middleware in the first network device.

In a possible implementation, the communication system further includes a third-party consumer device, and the third-party consumer device is configured to obtain the routing information from the data middleware in the first network device.

Each of the architectures of the foregoing two communication systems corresponds to the architecture of the communication system shown in FIG. 1. For details, refer to descriptions in FIG. 1.

This application provides a computer-readable storage medium. The computer-readable storage medium includes instruction; and when the computer-readable storage medium is run on a network device, the network device is enabled to perform any one of the foregoing routing information transmission methods.

An embodiment of this application provides a computer program product including instructions; and when the computer program product runs on a network device, the network device is enabled to perform any one of the routing information transmission methods in the foregoing method embodiments.

An embodiment of this application provides a chip. The chip includes a programmable logic circuit and/or program instructions. When the chip runs, the chip is configured to implement any one of the foregoing routing information transmission methods.

The network devices in the foregoing product forms all can implement any one of the foregoing routing information transmission methods. Details are not described herein again.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for convenient and brief description, for a detailed working process of the described system, apparatus, and unit, refer to a corresponding process in the foregoing method embodiments. Details are not described herein again.

In the several embodiments provided in this application, the disclosed system, apparatus and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units, in other words, may be located at one position, or may be distributed on a plurality of network units. Some or all of the units may be selected according to actual requirements to achieve the objectives of the solutions of embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Various equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A routing information transmission method, applied to a system comprising data middleware, a routing information base (RIB), and a RIB broker interface, wherein the data middleware and the RIB are applications running in a network device, and wherein the data middleware communicates with the RIB, the method comprising:

receiving, by the data middleware, a first request, wherein the first request is used to request target routing information; and sending, by the data middleware, the target routing information to a third-party consumer device in response to the first request, wherein the target routing information is obtained by the data middleware from the RIB, the data middleware communicates with the RIB through the RIB broker interface, and the RIB broker interface performs a compliance check to prevent a communication system fault caused by receiving non-compliant routing information.

2. The method according to claim 1, wherein the first request comprises:

a smoothing request received from the third-party consumer device; or a subscription request received from the third-party consumer device, wherein the subscription request comprises a target type, and a type of the target routing information corresponds to the target type.

3. The method according to claim 1, further comprising:

sending, by the data middleware, a smoothing request to the RIB in response to an exception in routing information stored in the data middleware;

obtaining, by the data middleware, smooth routing information received from the RIB based on the smoothing request; and storing, by the data middleware, the smooth routing information.

4. The method according to claim 3, further comprising:

performing, by the data middleware, reconciliation processing based on the smooth routing information and the stored routing information, wherein the stored routing information is routing information stored before the smooth routing information is obtained.

5. The method according to claim 1, further comprising:

subscribing, by the data middleware, to first-type routing information from the RIB; and obtaining, by the data middleware, the first-type routing information comprised in the RIB, wherein the first-type routing information comprises the target routing information.

6. A routing information transmission method, applied to a system comprising data middleware, a routing information base (RIB), and a RIB broker interface, wherein the data middleware and the RIB are applications running in a network device, and wherein the data middleware communicates with the RIB, the method comprising:

obtaining, by the data middleware, routing information generated by a third-party producer device;

storing, by the data middleware, the routing information; and sending, by the data middleware, target routing information to the RIB, wherein the target routing information is the same as the routing information, and wherein the data middleware communicates with the RIB through the RIB broker interface, and the RIB broker interface performs a compliance check to prevent a communication system fault caused by receiving non-compliant routing information.

7. The method according to claim 6, wherein before the sending, by the data middleware, the target routing information to the RIB, the method further comprises:

receiving, by the data middleware, a first request, wherein the first request is used to request the target routing information from the data middleware; and wherein the first request comprises:

a smoothing request received from the RIB; or a subscription request received from the RIB, wherein the subscription request comprises a target type, and a type of the target routing information corresponds to the target type.

8. The method according to claim 6, wherein the obtaining, by the data middleware, the routing information generated by the third-party producer device comprises:

sending, by the data middleware, a smoothing request to the third-party producer device in response to an exception in the routing information stored in the data middleware;

receiving, by the data middleware, smooth routing information received from the third-party producer device based on the smoothing request; and storing, by the data middleware, the smooth routing information.

9. The method according to claim 6, wherein the obtaining, by the data middleware, the routing information generated by the third-party producer device comprises:

sending, by the data middleware, a smoothing request to the third-party producer device in response to establishment of a connection between the data middleware and the third-party producer device;

receiving, by the data middleware, the smooth routing information received from the third-party producer device based on the smoothing request; and storing, by the data middleware, the smooth routing information.

10. The method according to claim 6, wherein the routing information corresponds to a first type, and the obtaining, by the data middleware, the routing information generated by a third-party producer device comprises:

sending, by the data middleware, a subscription request to the third-party producer device, wherein the subscription request comprises the first type, and the subscription request is used to request the routing information corresponding to the first type.

11. A routing information transmission apparatus, comprising:

one or more processors; and one or more memories configured to store instructions that, when executed by the one or more processors, implement applications including a data middleware, a routing information base (RIB), and a RIB broker interface, wherein the data middleware and the RIB are applications running in a network device, and wherein the data middleware communicates with the RIB;

wherein the data middleware is configured to receive a first request, wherein the first request is used to request target routing information; and wherein the data middleware is configured to send the target routing information to a third-party consumer device in response to the first request, wherein the target routing information is obtained by the data middleware from the RIB, the data middleware communicates with the RIB through the RIB broker interface, and the RIB broker interface performs a compliance check to prevent a communication system fault caused by receiving non-compliant routing information.

12. The apparatus according to claim 11, wherein the data middleware is further configured to:

send a smoothing request to the RIB in response to an exception in the stored routing information; and obtain smooth routing information received from the RIB based on the smoothing request; and store the smooth routing information.

13. The apparatus according to claim 12, wherein the data middleware is further configured to:

perform reconciliation processing based on the smooth routing information and stored routing information, wherein the stored routing information is routing information stored before the smooth routing information is obtained.

14. The apparatus according to claim 11, wherein the data middleware further configured to:

subscribe to first-type routing information from the RIB; and obtain the first-type routing information comprised in the RIB, wherein the first-type routing information comprises the target routing information.

15. The apparatus according to claim 11, wherein the data middleware is further configured to:

obtain routing information generated by a third-party producer device;

store the routing information; and send the target routing information to the RIB, wherein the target routing information is the same as the routing information.

16. The apparatus according to claim 15, wherein the data middleware is further configured to:

send a smoothing request to the third-party producer device in response to establishment of a connection to the third-party producer device;

receive smooth routing information from the third-party producer device based on the smoothing request; and store the smooth routing information.

17. The apparatus according to claim 15, wherein the routing information corresponds to a first type, and the data middleware is further configured to:

send a subscription request to the third-party producer device, wherein the subscription request comprises the first type, and the subscription request is used to request the routing information corresponding to the first type.

18. The method according to claim 1, wherein the RIB broker interface is further configured to perform a format conversion function that converts a format of routing information received by the RIB broker interface from the data middleware into a format corresponding to the RIB and/or converts a format of routing information received by the RIB broker interface from the RIB into a format corresponding to the data middleware.

19. The method according to claim 6, wherein the RIB broker interface is further configured to perform a format conversion function that converts a format of routing information received by the RIB broker interface from the data middleware into a format corresponding to the RIB and/or converts a format of routing information received by the RIB broker interface from the RIB into a format corresponding to the data middleware.

20. The apparatus according to claim 11, wherein the RIB broker interface is further configured to perform a format conversion function that converts a format of routing information received by the RIB broker interface from the data middleware into a format corresponding to the RIB and/or converts a format of routing information received by the RIB broker interface from the RIB into a format corresponding to the data middleware.

* * * * *